United States Patent [19]

Price et al.

[11] Patent Number: 5,420,867
[45] Date of Patent: May 30, 1995

[54] ISDN CALL PROCESSING

[75] Inventors: Steven Price, Overton; David J. White, Winchester; Barry J. Worley, Southampton, all of Great Britain

[73] Assignee: International Business Machines Corporation, Armonk, N.Y.

[21] Appl. No.: 156,483

[22] Filed: Nov. 23, 1993

[30] Foreign Application Priority Data

Dec. 22, 1992 [GB] United Kingdom ............ 9226692

[51] Int. Cl.$^6$ .................................................. H04J 3/12
[52] U.S. Cl. .................................................. 370/110.1
[58] Field of Search ............... 370/110.1, 94.1, 60, 370/85.1, 84, 95.1, 91–94; 395/725, 600, 500, 775, 325, 375, 425, 700; 375/8, 7

[56] References Cited

U.S. PATENT DOCUMENTS

| | | | |
|---|---|---|---|
| 5,012,470 | 4/1991 | Shobu et al. | 370/110.1 |
| 5,204,961 | 4/1993 | Barlou | 395/725 |
| 5,278,834 | 1/1994 | Mazzola | 370/94.1 |
| 5,280,477 | 1/1994 | Trapp | 370/85.7 |

Primary Examiner—Douglas W. Olms
Assistant Examiner—Dang Ton
Attorney, Agent, or Firm—Stephen T. Keohane

[57] ABSTRACT

A first terminal makes a call over an ISDN link to a second terminal. Both terminals support a plurality of possible protocols to be used on the ISDN B channel. The calling terminal builds the protocol stack for the desired protocol prior to requesting the call from the network. When it is notified of the B channel selected, it can then attach the already formed protocol stack to the relevant B channel. Similarly, the called terminal starts to build the desired protocol stack immediately on receipt of the call. When the protocol stack is complete, is then accepts the call from the network, and can attach the protocol stack immediately to the relevant B channel.

8 Claims, 2 Drawing Sheets

ISDN CALL PROCESSING

BACKGROUND OF THE INVENTION

1. Field of the Invention

The present invention relates to the processing of Integrated Services Digital Network (ISDN) calls, and more particularly to the making of outgoing calls and the receipt of incoming calls when a multiplicity of channels and protocols are available for use.

2. Prior Art

Integrated Services Digital Network (ISDN) is a set of internationally agreed standards specified in the so-called "Blue books" of the International Telegraph and Telephone Consultative Committee (CCITT). ISDN allows voice, data and other applications to communicate over wide bandwidth communications networks. ISDN defines a series of layers as well as the interfaces between these layers, through which voice or data can be passed from an application program onto the network and vice versa. Further information about ISDN can be found in, e.g., "ISDN Explained" by J. Griffiths (Wiley, 1990) and "ISDN: An Introduction" by W. Stallings (MacMillan 1989).

A standard or basic rate ISDN link comprises three channels multiplexed on a single physical line: one "D-channel" with a data rate of 16 kbits $s^{-1}$, and two "B-channels", each with a data rate of 64 kbits $s^{-1}$. The D-channel is primarily intended for signalling—e.g., setting up and finishing calls—and a standard protocol known as LAP-D ("Link Access Procedure for the D-channel") must be used. By contrast, the two B-channels ("bearer" channels) are essentially at the user's disposal to send information down, and can be thought of as analogous to hollow pipes. There is no network-provided error-checking on the B-channel, and no predetermined protocol, these being left instead to the user's discretion.

At the start of any call therefore, it is necessary for the calling and called parties to agree on the format or protocol that they will use on the B channel (examples of possible protocols are X.25 and System Network Architecture (SNA)). This agreement is performed as part of the call set-up procedure for messages sent on the B-channel. Once agreement has been reached on which protocol to use, the corresponding protocol stack can be built. A protocol stack is the body of code, representing the layers of the selected protocol, that is used to convert a call between the data format of the application and the format required for transmission. The code will normally be resident at the terminal, but will need initialization for each individual call—e.g. what buffer size to use, what values to set for a time out, if no response is received from the network or another layer in the communications system, and so on.

A problem has arisen in the implementation of such systems in that once the protocol for the B-channel has been selected, there is a delay of up to a few seconds (depending on processor speed) while the relevant protocol stack is built. There is a possibility that during this delay the network will misinterpret the inactivity, and disconnect the call. Alternatively, a premature indication that the terminal is ready may result in the terminal receiving data before the protocol is in place to interpret the incoming signals. Similar problems may also arise from the availability of two B channels, since initially neither party will be certain which channel will be allocated for the call.

SUMMARY AND OBJECTS OF THE INVENTION

Accordingly, the invention provides a method of making an outgoing call from a terminal over an Integrated Services Digital Network ISDN) line providing one or more bearer channels that allow a user-selected protocol, the terminal supporting a plurality of possible protocols for use on said bearer channels, said method comprising the steps of:
- selecting the protocol to be used for the outgoing call;
- building a protocol stack for the selected protocol;
- requesting the network to make the call;
- receiving from the network the identity of an agreed bearer channel and notification that the call has been accepted; and
- associating the protocol stack with the agreed channel.

The invention seeks to allow the building of the protocol stack and the channel negotiation to proceed effectively independently of one another, only binding the two together at the end once everything has been decided. It should be appreciated that building the protocol stack may occur at least partially at when the terminal is first switched on and the communications process initialized (i.e., prior to the application selecting the protocol for any particular call).

The agreement on which bearer channel to use is between the network and the calling party alone. A separate agreement is reached between the network and the called party, with the network then being responsible for matching the agreed bearer channels together. Typically the calling party will receive agreement on the bearer channel while the network is still establishing the call to the called party, with the notification of call acceptance only coming through later (if at all).

The invention also provides a method of receiving an incoming call at a terminal over an Integrated Services Digital Network (ISDN) line providing one or more bearer channels that allow a user-selected protocol, the terminal supporting a plurality of possible protocols for use on said bearer channels, said method comprising the steps of:
- receiving notification of the call from the network and identifying the selected protocol;
- building a protocol stack for the selected protocol;
- agreeing with the network which bearer channel to use;
- associating the protocol stack with the agreed channel; and
- accepting the call from the network.

Thus the party receiving the call ensures that the relevant protocol stack is available before the call is accepted. This is before charging for the call would normally occur, yet still ensures that the terminal is ready in timely fashion to receive any data transmitted down the bearer channel. Again, it should be appreciated that it is possible to either build a set of protocol stacks as part of some start up procedure for the terminal (i.e., prior to receiving notification of the call), or else to build a protocol stack in response to a particular call. In the latter case, it is desirable to respond to the network with some form of alerting signal to prevent a time-out occurring for the call while the relevant protocol stack is being built.

The invention further provides a terminal adapted to make an outgoing call over an Integrated Services Digital Network (ISDN) line providing one or more bearer channels that allow a user-selected protocol, the terminal supporting a plurality of possible protocols for use on said bearer channels, and including:

means for selecting the protocol to be used for the outgoing call;

means for building a protocol stack for the selected protocol;

means for requesting the network to make the call;

means for receiving from the network notification that the call has been accepted and the identity of an agreed bearer channel; and means for associating the protocol stack with the agreed channel.

The invention further provides a terminal adapted to receive an incoming call over an Integrated Services Digital Network (ISDN) line providing one or more bearer channels that allow a user-selected protocol, the terminal supporting a plurality of possible protocols for use on said bearer channels, and including:

means for receiving notification of the call from the network and identifying the selected protocol;

means for bulkling a protocol stack for the selected protocol;

means for agreeing with the network which bearer channel to use;

means for associating the protocol stack with the agreed channel; and means for accepting the call from the network.

BRIEF DESCRIPTION OF THE DRAWINGS

An embodiment of the invention will now be described by way of example with reference to the following drawings.

DETAILED DESCRIPTION OF THE PREFERRED EMBODIMENT

Figure 1:
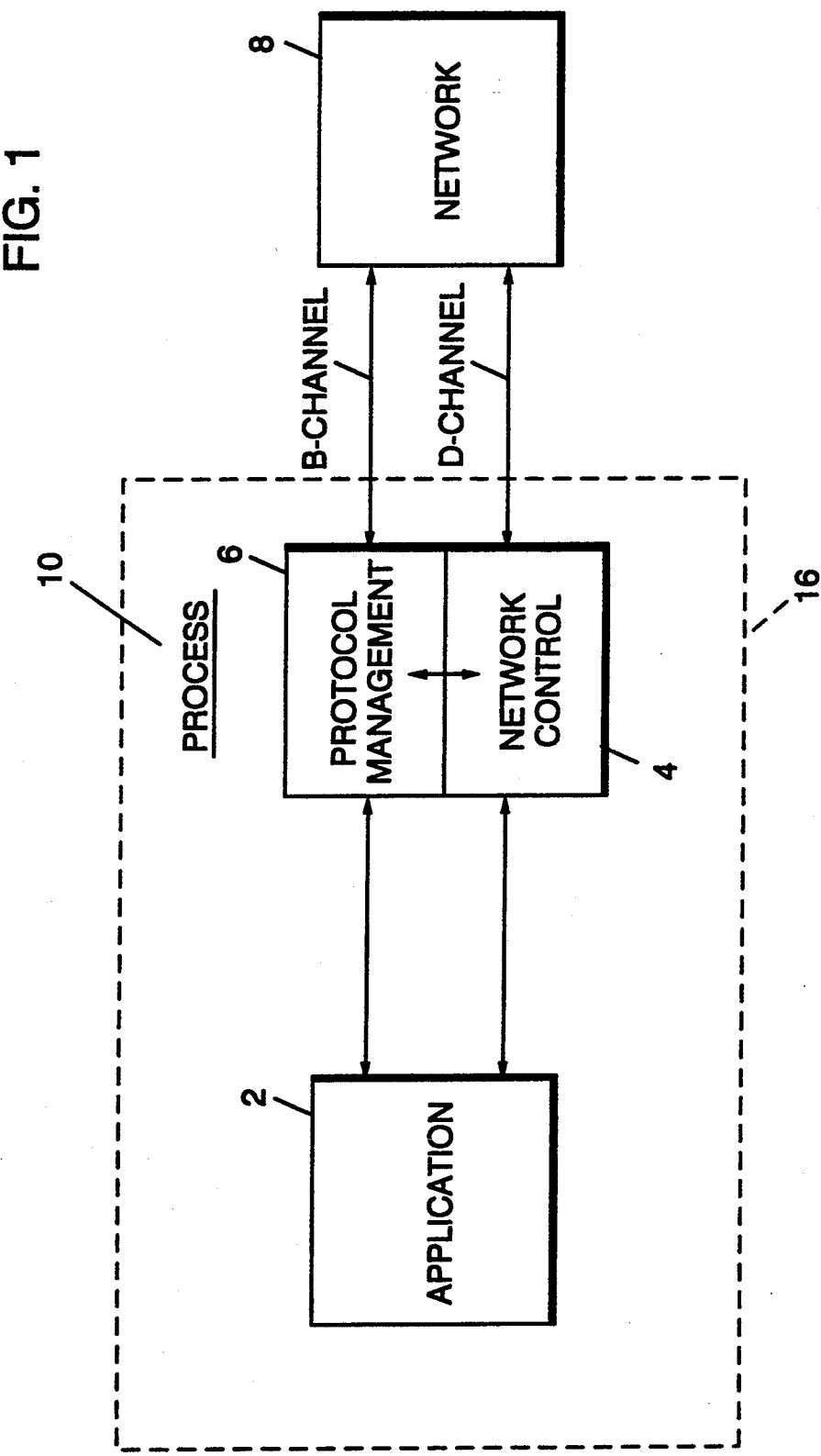
FIG. 1 is a schematic diagram illustrating a typical ISDN terminal.

FIG. 1 illustrates schematically a terminal 16, typically a small computer workstation, for connection to an ISDN network 8. The workstation runs an application 2, which requires data to be sent or received over an Integrated Services Digital Network (ISDN). The application knows very little about the network, but instead relies upon a communications process 10 to provide an interface between the network and the application. This approach, which is consistent with Open Systems Interconnection, allows (in theory) the application to be used with a wide variety of networks.

The communications process for the purposes of the present invention can be regarded as consisting of two main components. The first of these, the network control subsystem 4, is responsible for interacting with the network to set up calls, terminate calls and so on. The network control subsystem communicates with the network via the ISDN D-channel, using the LAP-D format. There are predefined forms of message which the network control subsystem can send on the D-channel when it wants for example to initiate a call, or which the network can send to the network control subsystem to request that it receives a message.

The second important subsystem 6 of the communications process is responsible for protocol management on the B-channel (or B-channels). Thus data from the application is converted by this subsystem into the appropriate format before being transmitted onto the network on the B-channel. Typically this might involve segmenting the data into frames and packets, adding address information, error control, frame numbers and so on. Likewise, messages incoming from the network on the B-channel are converted by this subsystem into a form in which they can be interpreted by the application. Note that unlike with the D-channel, there is no dialog between the process and the network per se on the B-channel, since the purpose of B-channel is to provide an essentially transparent connection between two communicating terminals.

The communications process supports a multiplicity of protocols on the B-channel (possible examples might be X.25 and SNA). For each incoming or outgoing call, it is necessary for the correct protocol to be associated with the B-channel being used. It is the responsibility of the network control subsystem to build this protocol at the start of each call. Typically the protocol would consist of OSI layers 2-5 (layers 6-7 being provided in the application). Layer 1 (not shown in FIG. 1), which first receives incoming calls from the network, is responsible among other things for splitting signals into D-channel and B-channel and so can be regarded as common to both the network control and protocol management subsystems.

Figure 2:
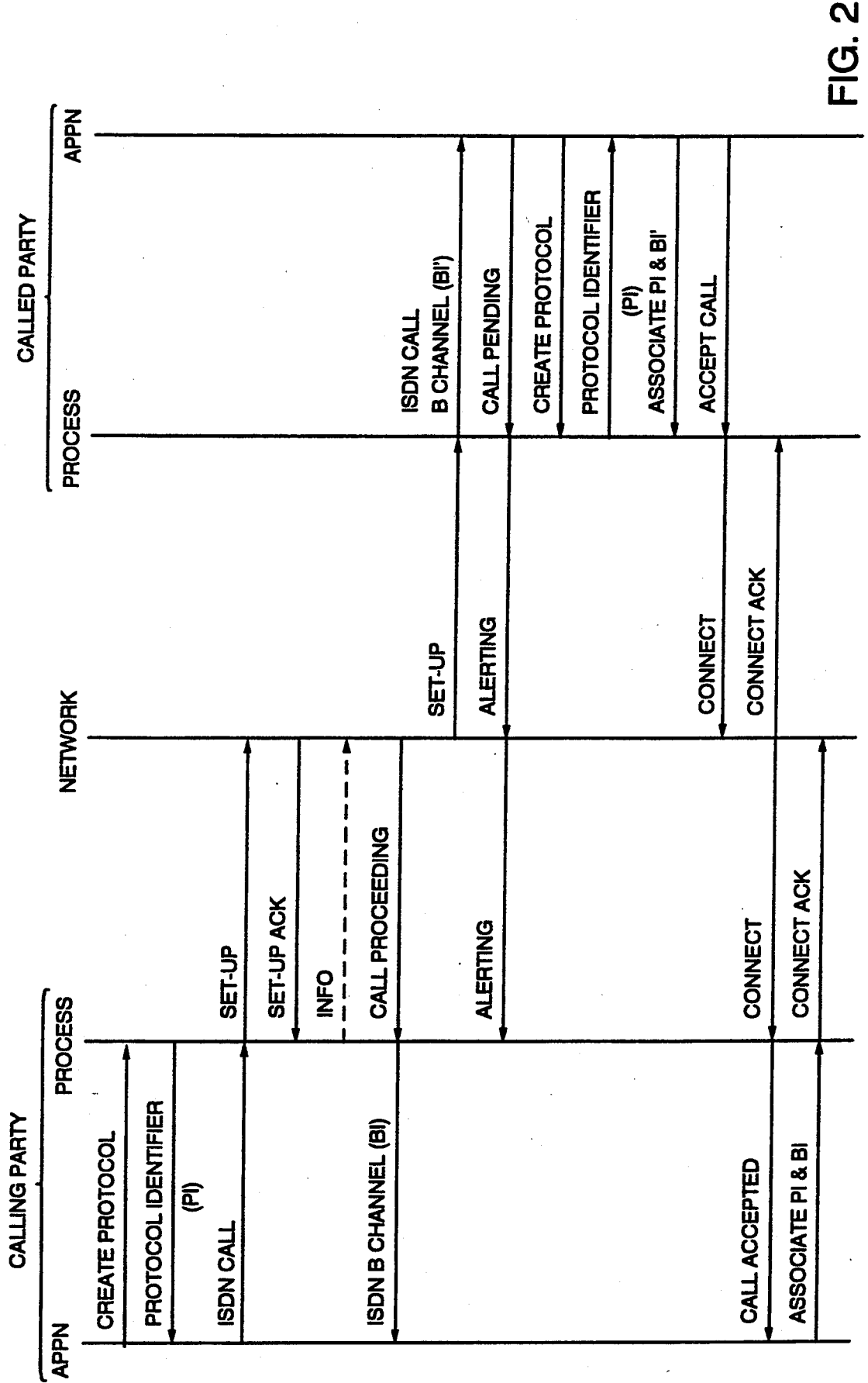
FIG. 2 illustrates the call set-up procedure at the calling and called terminals in accordance with the methods of the invention.

FIG. 2 illustrates the events whereby a call is connected in accordance with the present invention, with the calling party shown to the left of the network, and the called party to the right. The messages exchanged between each party and the network follow the requirements of recommendation Q.931 of the Blue Books. The messages sent within either terminal (i.e. from the application to the process and vice versa) represent the internal command processing. This processing is not defined by the ISDN standards, but rather is left for the user to design.

The method for establishing a call between two parties begins with the calling party creating a protocol for the B channel. The terminal supports a plurality of different protocols, which are to convert data from the application into a form suitable for transmission over the network and vice versa. The terminal stores information about each protocol, which can then be used to build the corresponding protocol stack. A supported protocol stack can either be built when at system startup, or alternatively, this could be delayed until immediately prior to a call being made. A protocol stack may be built for each data format or protocol that the communications process supports. The application selects the protocol to be used, and indicates this to the communications process. The communications process then returns an identifier, PI, to the selected protocol stack, building the stack first if it has not already done so.

The application now requests that an ISDN call be made, which results in a set-up message being transmitted to the network (this is the first step that involves action external to the calling terminal). This setup request typically contains the called number, and details about the desired connection. It should be appreciated that most ISDN messages start timers running either in the network or the two terminals involved. If no response is received to the messages before the timer expires, the call will be aborted. Thus it is important to be able to respond reasonably promptly to any incoming message to avoid the danger of the call being terminated prematurely.

The network responds with a setup acknowledgement message, which may include a request for more information (for example, the type of facilities required). Once the network has sufficient details to proceed, it sends a call proceeding message back to the calling terminal, and transmits a set-up message to the called terminal. The call proceeding message to the calling party and the set-up message to the called terminal include an identification of the B channel allocated to the call by the network. At this point and depending on the type of equipment being used, the called terminal rings.

It should be appreciated that the identity of the B channel between the calling party and the network is not directly related to the identity of the B channel between the network and the called party. Rather, these two are negotiated independently between the parties concerned. It is then the responsibility of the network to ensure that these two B channels are correctly linked to one another.

On receipt of the set-up message, the communications process in the called terminal informs the application of the arrival of the call, which replies with a call pending message. This causes an alerting message to be sent from the called terminal to the network, which forwards the message on to the calling terminal. It is also possible for the called terminal to request more information from the network at this stage, analogous to the set-up acknowledge/information phase on the calling side. The alerting message indicates that the call has reached its intended destination, which is not otherwise engaged. Meanwhile, the application instructs the communications process to create a protocol in accordance with the set-up message. There are various ways of determining which protocol should be used—for example, the protocol selected might depend on the calling number, the called number, or be specified in the set-up message. Again, the protocol stack may already have been built when the communication process was first started up, or at some other previous time—if not, the communication process has to specifically build the requested protocol stack on receipt of the set-up message.

Once the protocol stack has been completed, the communications process returns an identifier (PI) for the protocol stack to the application. The application now uses this identifier to instruct the communications process to associate the protocol stack with the correct B-channel, and to accept the call, resulting in a connect message being sent back to the network. The network replies with a connect acknowledge message, and transmits a connect message to the calling party (and depending on the network would typically start charging for the call from this point). On receipt of the connect message, the communications process informs the application accordingly. The application then instructs the communications process to associate the protocol stack which it had previously built with the B channel, and to send a connect acknowledge message back to the network. The two terminals are now ready to begin communicating over the agreed B channel.

We claim:

1. A method of making an outgoing call from a calling terminal to a called terminal over an Integrated Services Digital Network (ISDN) providing one or more bearer channels that allow a user-selected protocol, the calling terminal supporting a plurality of possible protocols for use on the bearer channels, the method comprising, in the calling terminal, the steps of:

selecting a protocol of the plurality of possible protocols to be used for the outgoing call;

building a protocol stack for the selected protocol;

sending a message to the ISDN requesting the ISDN to set up the outgoing call;

receiving, from the ISDN, a message having the identification of the bearer channel over which the outgoing call will be made between the calling terminal and the ISDN;

receiving, from the ISDN, an alert message indicating that the outgoing call set-up has been received by the called terminal and that completion of the outgoing call is pending;

receiving, from the ISDN, a message indicating that the outgoing call has been accepted; and associating the protocol stack with the bearer channel.

2. The method defined in claim 1 wherein the calling terminal has a timer for monitoring the amount of time that has passed between message exchanges between the calling terminal and the ISDN, and wherein the method further comprising the step, after the receiving an alert message step, of resetting the timer.

3. A method of receiving an incoming call at a called terminal from a calling terminal over an Integrated Services Digital Network (ISDN) providing one or more bearer channels that allow a user-selected protocol, the called terminal supporting a plurality of possible protocols for use on the bearer channels, the method, in the called terminal, comprising the steps of:

receiving a notification from the ISDN of an incoming call and selecting a protocol from the plurality of possible protocols to use with the incoming call;

sending an alert message to the ISDN indicating that the incoming notification has been received by the called terminal and that completion of the incoming call is pending;

building a protocol stack for the selected protocol;

agreeing with the ISDN as to the bearer channel over which the incoming call will be received between the called terminal and the ISDN;

associating the protocol stack with the agreed bearer channel; and accepting the incoming call from the ISDN.

4. A calling terminal adapted to make an outgoing call to a called terminal over an Integrated Services Digital Network (ISDN) providing one or more bearer channels that allow a user-selected protocol, the calling terminal supporting a plurality of possible protocols for use on the bearer channels, the calling terminal comprising:

means for selecting a protocol of the plurality of possible protocols to be used for the outgoing call;

means for building a protocol stack for the selected protocol;

means for sending a message to the ISDN requesting the ISDN to make the outgoing call;

means for receiving, from the ISDN, a message having the identification of the bearer channel over which the outgoing call will be made between the calling terminal and the ISDN;

means for receiving, from the ISDN, an alert message indicating that the outgoing call set-up has been received by the called terminal and that completion of the outgoing call is pending;

means for receiving, from the ISDN, a message indicating that the outgoing call has been accepted; and means for associating the protocol stack with the bearer channel.

5. The calling terminal defined in claim 4 further comprising a timer for monitoring the amount of time that has passed between message exchanges between the calling terminal and the ISDN, and means for resetting the timer upon receiving an alert message.

6. A called terminal adapted to receive an incoming call from a calling terminal over an Integrated Services Digital Network (ISDN) providing one or more bearer channels that allow a user-selected protocol, the called terminal supporting a plurality of possible protocols for use on the bearer channels, the called terminal comprising:

means for receiving a notification from the ISDN of an incoming call;

means for selecting a protocol to use from the plurality of possible protocols with the incoming call;

means for sending an alert message to the ISDN indicating that the incoming notification has been received by the called terminal and that completion of the incoming call is pending;

means for building a protocol stack for the selected protocol;

means for agreeing with the ISDN as to the bearer channel over which the incoming call will be received between the called terminal and the ISDN;

means for associating the protocol stack with the agreed bearer channel; and means for accepting the incoming call from the ISDN.

7. An Integrated Services Digital Network (ISDN) providing one or more bearer channels that allow a calling terminal to communicate with a called terminal by making a call through the ISDN via a user-selected protocol, the calling terminal and the called terminal each supporting a plurality of possible protocols for use on the bearer channels and having means for selecting a protocol of the plurality of possible protocols to be used for the call, the ISDN comprising:

means for receiving a message from the calling terminal requesting the ISDN to make a call to the called terminal;

means for sending to the calling terminal a message having the identification of the bearer channel over which the call will be made between the calling terminal and the ISDN;

means for sending a message to the called terminal indicating that the calling terminal is requesting to make a call to the called terminal;

means for sending to the called terminal a message having the identification of the bearer channel over which the call will be made between the called terminal and the ISDN;

means for receiving from the called terminal an alert message indicating that the call set-up has been received by the called terminal and that completion of the outgoing call is pending;

means for sending to the calling terminal an alert message indicating that the call set-up has been received by the called terminal and that completion of the outgoing call is pending;

means for receiving, from the called terminal, a message indicating that the outgoing call has been accepted by the called terminal; and means for sending to the calling terminal a message indicating that the outgoing call has been accepted by the called terminal.

8. A method for use in an Integrated Services Digital Network (ISDN) providing one or more bearer channels that allow a calling terminal to communicate with a called terminal by making a call through the ISDN via a user-selected protocol, the calling terminal and the called terminal each supporting a plurality of possible protocols for use on the bearer channels and having means for selecting a protocol of the plurality of possible protocols to be used for the call, the method comprising the steps of:

receiving a message from the calling terminal requesting the ISDN to make a call to the called terminal;

sending to the calling terminal a message having the identification of the bearer channel over which the call will be made between the calling terminal and the ISDN;

sending a message to the called terminal indicating that the calling terminal is requesting to make a call to the called terminal;

sending to the called terminal a message having the identification of the bearer channel over which the call will be made between the called terminal and the ISDN;

receiving from the called terminal an alert message indicating that the call set-up has been received by the called terminal and that completion of the outgoing call is pending;

sending to the calling terminal an alert message indicating that the call set-up has been received by the called terminal and that completion of the outgoing call is pending;

receiving, from the called terminal, a message indicating that the outgoing call has been accepted by the called terminal; and sending to the calling terminal a message indicating that the outgoing call has been accepted by the called terminal.

* * * * *